United States Patent [19]

Mero et al.

[11] 3,844,395

[45] Oct. 29, 1974

[54] TEXT DISPLAY CONTROL FOR DATA PRINTER

[75] Inventors: Peter G. S. Mero, Winnetka; George W. Volling, Round Lake Beach, both of Ill.

[73] Assignee: Extel Corporation, Northbrook, Ill.

[22] Filed: Sept. 12, 1973

[21] Appl. No.: 396,393

[52] U.S. Cl. .............................. 197/1 R, 197/133 R

[51] Int. Cl. .............................. B41j 3/44

[58] Field of Search ...... 197/1, 114, 133; 101/93 C, 101/66, 96

[56] References Cited

UNITED STATES PATENTS

| | | | |
|---|---|---|---|
| 3,244,095 | 4/1966 | Matthew | 197/133 R |
| 3,400,798 | 9/1968 | Smith | 197/1 R |
| 3,545,373 | 12/1970 | Spaulding | 197/1 R |
| 3,605,978 | 9/1971 | Kawano | 197/1 R X |
| 3,759,359 | 9/1973 | Stellmach | 197/1 R |

*Primary Examiner*—Robert E. Pulfrey
*Assistant Examiner*—R. T. Rader
*Attorney, Agent, or Firm*—Kinzer, Plyer, Dorn & McEachran

[57] ABSTRACT

A text display system for a signal-actuated data printer of the kind in which a ribbon, print head, or other printer component masks the final line, or next-to-last line, or other terminal portion of the text on the printed record sheet; the system includes detector apparatus for sensing the absence or presence of a code word in an output level of an input data store for the printer. The detector apparatus actuates a record sheet shifting apparatus to shift the record sheet to a text display position when the data store output level is empty and to shift the record sheet back to a printing position when a new code word input occurs.

12 Claims, 5 Drawing Figures

TEXT DISPLAY CONTROL FOR DATA PRINTER

BACKGROUND OF THE INVENTION

There are a number of different printer mechanisms utilized in telegraph systems, data processing systems, and like applications, in which some component of the printer masks a terminal portion of the text printed on a record sheet. For example, in a dot matrix printer of the kind shown in U.S. Pat. No. 3,670,861, of Zenner and Kranz, the carriage and print head of the printing mechanism make it difficult to read the last few characters that have been printed. In this same machine, and in other similar printers in which the record sheet is supported upon a roller platen for the printing operation, a bail bar may extend across the sheet to hold it upon the platen and may obscure the next-to-last line or other terminal portion of the printed text. In other printers, whether employing a dot matrix, print head or other printing mechanism, a printing ribbon may mask the entire final line of the printed text.

The masking of the terminal portion of the printed text presents some substantial difficulties for the printing machine operator. If the printer is being used to record data entered by a keyboard that is a part of or directly associated with the printer, the operator cannot conveniently determine whether an error has been made in the terminal portion of the text without creating a text discontinuity, as by advancing the record sheet to a position for visibility. If a possible error is simply ignored, time is lost through the necessity of recording an alternate text after the erroneous portion has reached a point at which it can be seen in the printer. Where the printer is used to record received telegraph signals or other data signals originating from a remote point, the operator cannot readily determine if a particular transmission has been completed, as in those instances in which the remotely originated signal does not include a line feed or other suitable signal for advancing the record sheet to display position at the end of a specific message. Under such circumstances, considerable delay may be introduced in the overall operation before the operator at the receiving printer can decide if a message is indeed complete so that record sheet can be advanced to allow reading of the final portion of the text. If the operator makes this decision too early, and advances the paper too soon, the result may be a gap in the text or even a distortion of some of the text material, particularly if the machine resumes operation at the time the operator is shifting the record sheet to a visible position.

One solution to this problem, employed in conventional typewriters and other similar printers, entails the displacement of the ribbon or other masking part of the printing machine so that the full text is revealed upon completion of the printing of each character. This solution is not convenient or practical in many printers, particularly printers operated at high speeds, since it introduces excessive mechanical movement and vibration. In many printers, particularly dot matrix printers, the mechanical problems of moving the masking part of the printer are so difficult as to be almost impossible.

SUMMARY OF THE INVENTION

It is a principal object of the invention, therefore, to provide a new and improved text display system for a signal actuated data printer of the kind in which some printer component such as a print head or a ribbon masks the terminal line or other portion of the printed text, which system shifts the record sheet to a text display position whenever the input signal is interrupted and rapidly shifts the record sheet back to a printing position whenever the input signal is resumed.

A further object of the invention is to provide a new and improved text display system for a signal-actuated data printer that does not interfere with normal continuous operation of the printer and that allows for effective high speed operation of the printer.

A particular object of the invention is to provide a new and improved text display system for a signal actuated data printer that allows full reading of the terminal portion of the printed text at any time when printing is interrupted, even though the interruption may be relatively brief, without distortion or disturbance of the appearance of the text.

A specific object of the invention is to provide a new and improved text display system for a signal actuated high speed data printer that is relatively simple and economic in construction, that requires no mechanical changes in the printer, and that is capable of long term operation with little or no special maintenance or expense.

Accordingly, the invention is directed to a text display control for a data printer for printing a data symbol text on a record sheet in response to an input signal including a sequence of code words representative of symbols to be printed and of non-print functions for the printer, of the kind comprising a data store for recording the input signal, a printing mechanism responsive to data recorded in the data store for recording symbols on a record sheet, and record sheet shift means for shifting the record sheet between a printing position in which some component of the printer masks a terminal portion of the printed text on the record sheet and a text display position in which the terminal portion of the text is visible. The text display control comprises display detector means, coupled to the data store, for developing a display signal indicative of the absence of a code word in an output level of the data store and print reset detector means, coupled to the data store and to the display detector means for developing a print reset signal indicative of the recording of a code word in the output level of the data store after the record sheet has been shifted to its text display position. Further, the text display control includes means for applying the display and print reset signals to the record sheet shift means to actuate the record sheet shift means to actuate the record sheet to its text display position and to return the record sheet to its printing position.

DESCRIPTION OF THE PREFERRED EMBODIMENTS

Figure 1:
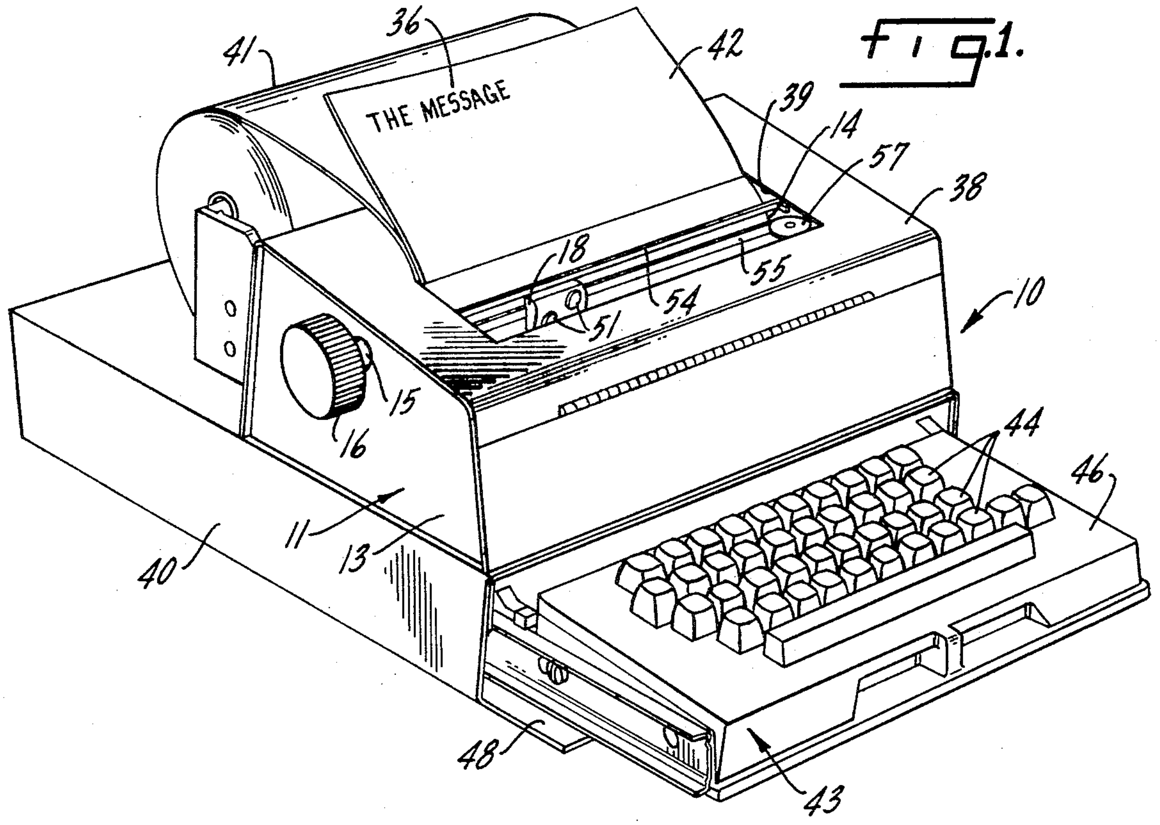
FIG. 1 is a perspective view of a high speed dot matrix data printer of a kind in which the text display system of the present invention may be incorporated to particular advantage.
Figure 2:
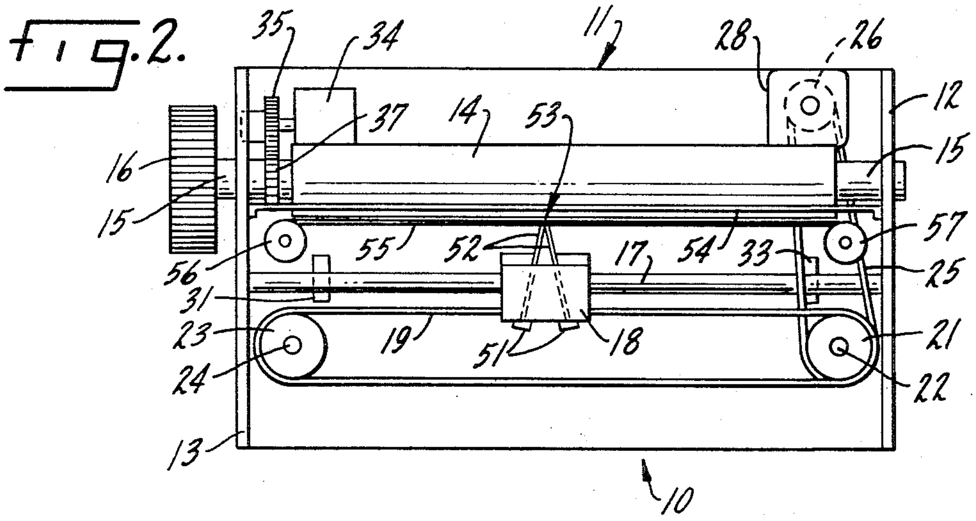
FIG. 2 is a simplified plan view of the printing mechanism of the printer illustrated in FIG. 1, with the covers removed and the keyboard omitted.
Figure 3:
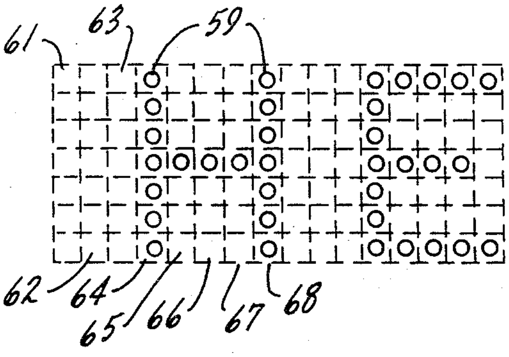
FIG. 3 illustrates the form of the characters printed by the printer of FIGS. 1 and 2.

FIGS. 1 and 2 illustrate a high speed printing machine 10, comprising a telegraph transceiver, in which the text display control of the present invention can be employed to substantial advantage; the printer 10 produces characters in the dot matrix form illustrated in FIG. 3. Printer 10 comprises a base 11 with two vertical frame members 12 and 13 affixed to the opposite sides of the base (FIG. 2). A platen 14 is mounted upon a rotatable shaft 15 that extends between the two side frame members 12 and 13. A knob 16 is mounted on one end of shaft 15 to provide for manual rotation of platen 14 (FIGS. 1 and 2).

As best shown in FIG. 2, a carriage guide rail 17 is mounted at the front end of printer 10, extending transversely of the printer parallel to platen 14. A print head carriage 18 is mounted upon guide rail 17 and is connected to the ends of a carriage positioning belt 19. Preferably, belt 19 is a toothed belt of the kind known as a timing belt. The right hand side of belt 19 extends around a drive sprocket 21 mounted upon a shaft 22 that projects upwardly from the printer base 11. The opposite side of belt 19 engages another sprocket 23 mounted upon a vertical shaft 24 at the left hand side of the printer base 11.

The sprocket shaft 22 is connected to a pulley (not shown) that is engaged by a drive belt 25. Drive belt 25 extends around a drive sprocket 26 that is mounted upon the shaft of a reversible stepping motor 28, referred to hereinafter as the carriage drive motor. The carriage drive motor 28 is a versible motor that rotates through a discrete angle of rotation each time an electrical signal pulse is applied to the windings of the motor. There are two margin control switches 31 and 33 mounted on the printer base 11 in position to be actuated by carriage 18 (FIG. 2). Switch 31 is located at the left-hand side of printer 10 and switch 33 is located at the right-hand side of the printer.

Printer 10 also includes a line feed actuator 34 that is mounted in the rear left-hand corner of the printer, on base 11, as seen in FIG. 2. Actuator 34 could comprise a pair of solenoids, but preferably constitutes a reversible stepping motor, sometimes referred to hereinafter as the line feed drive motor, similar to the carriage drive motor 28. A driving connection is provided between the line feed drive motor 34 and the rotary platen 14; in the illustrated construction, this drive connection comprises a pinion gear 35 mounted on the output shaft of motor 34 in meshing engagement with a spur gear 37 that is mounted on the platen shaft 15. Most of the operating mechanism for printer 10 that is shown in FIG. 2 is enclosed by a cover 38, as illustrated in FIG. 1; the cover 38 is provided with a large upwardly facing opening 39 through which the platen 14 and a part of the printer mechanism can be seen. In a practical construction, opening 39 is covered with a transparent viewplate to protect the printer mechanism.

A roll of paper record sheet material 41 is mounted at the rear of the printer 10, as shown in FIG. 1. The paper record sheet 41 extends into the printing mechanism, around the platen 14, under a bail bar 54, and back out of the opening 39 in the machine cover 38. The portion 42 of the record sheet 41 that projects outwardly of the top of printer 10 is the portion on which data has been recorded by the printer, as indicated by reference numeral 36.

In the complete transceiver illustrated in FIG. 1, printer 10 is mounted upon a housing 40 for a retractable electric keyboard 43 that includes the usual complement of keys 44. Keyboard 43 may be supported for movement between a retracted storage position within the keyboard housing 40 and an extended operating position as illustrated in FIG. 1, utilizing the keyboard mounting structure described in Mero U.S. Pat. No. 3,732,965. When keyboard 43 is retracted within housing 40, the front of the housing is preferably closed by a closure member or door 48.

A plurality of print head magnets 51 are mounted upon the print head carriage 18 (FIGS. 1 and 2). In one typical construction, a total of seven print head magnets 51 are employed, as shown in Zenner and Kranz U.S. Pat. No. 3,729,079. Each of the print head magnets 51 affords a drive means for axial movement of an individual print rod 52 (FIG. 2). The ends of the print rods 52 terminate in a vertical linear array spaced a very short distance from platen 14 at a printing station 53 that traverses the platen longitudinally as the print head carriage 18 moves along guide rail 17 as described hereinafter. It will be recognized that details of a number of the mechanical linkages in the printer 10, as illustrated in FIG. 2, have been omitted as unnecessary for an understanding of the present invention; these may include a return spring for the return of print head carriage 18 to the left-hand margin of the printer and a clutch to release the carriage drive for a carriage return movement. The preferred construction for the print head carriage 18, the print head magnets 51, and the print rods 52 is illustrated in detail in U.S. Pat. No. 3,729,965 of Zenner and Kranz.

Impact-sensitive paper may be utilized as the recording sheet 41 in printer 10. On the other hand, in many applications this relatively expensive paper may not be desirable. For such applications, printer 10 is equipped with an inked ribbon or carbon ribbon 55 that extends through printing station 53, between platen 14 and the tip ends of print rods 52. The ends of ribbon 55 are taken up on two spools 56 and 57. If a ribbon is employed, an appropriate mechanism for advancing ribbon 55 to present fresh lengths of the ribbon for successive imprints is incorporated in printer 10, but has not been shown in the drawings.

The basic construction for printer 10, as described above, is already known in the art, so that only a brief description of the mechanical operation of the printer is necessary in this specification. Before printer 10 is placed in operation, as noted above, the paper record sheet 41 is extended around platen 14, between the platen and the outer ends of the print rods 52. The starting position for the print head carriage 18 is at the left-hand end of its travel on guide 17, adjacent the left-hand margin switch 31. For the first character to be imprinted, such as the character "H" illustrated in FIG. 3, carriage 18 advances a given number of discrete steps from left to right, the carriage being driven by its positioning belt 19 through the drive afforded by motor 28, drive belt 25, and sprocket 21. In the illustrated embodiment, eight discrete steps are used for each character. During the first three steps or column movements of the print head carriage 18, no impression is made on the record sheet, paper 41, in the next five steps of the carriage, a complete character is imprinted by selective actuation of the print rods 52. Of course, a different format could be employed, depending upon the requirements of the symbols to be printed and other factors not critical to the present invention.

As shown in FIG. 3, the initial advancing movement of carriage 18 leaves three blank columns 61, 62, and 63 preceding the first printed character. In the next column 64, all seven of the print rods 52 are driven into impact with the paper record sheet, producing seven vertical dot impressions 59. On the next incremental step 65 in the advancing movement of carriage 18, only one dot impression 59 is formed, at the fourth or center level. This action is repeated in the next two columns 66 and 67. In the eighth step for carriage 18, all seven of the print rods 52 are again actuated, producing seven dot impressions in the final column 68. This results in the formation of the letter H as illustrated in FIG. 2. In this same manner, a complete line of data symbols (letters, numbers, or other symbols) is imprinted across the paper record sheet 41 on platen 14 (FIG. 1), with carriage 18 moving from left to right a total of eight steps for each individual symbol.

At the end of any complete eight-column movement of carriage 18, whether or not that movement includes printing of a data symbol, the print head carriage 18 may be returned to the left-hand limit of its travel to begin the printing of a new line of text on the paper 41. The carriage return operation may be initiated by a carriage return code word incorporated in the input signal to control printer 10. Alternatively, a carriage return movement may be initiated by engagement of carriage 18 with the right hand limit switch 33. That is, switch 33 can be employed to actuate the carriage return and line feed mechanisms of printer 10 on a mandatory basis to return the carriage to the initial left-hand position for the beginning of a new line and to feed the paper web 41 around platen 14. Before printing of a new line of text is initiated, the line feed drive motor 34 rotates platen 14 through one or more feed increments, by means of the drive connection afforded by gears 35 and 37, aligning a fresh line segment of the record sheet 41 with carriage 18. Other non-print function codes may be included in the received signal to control other printer operations.

Figure 4:
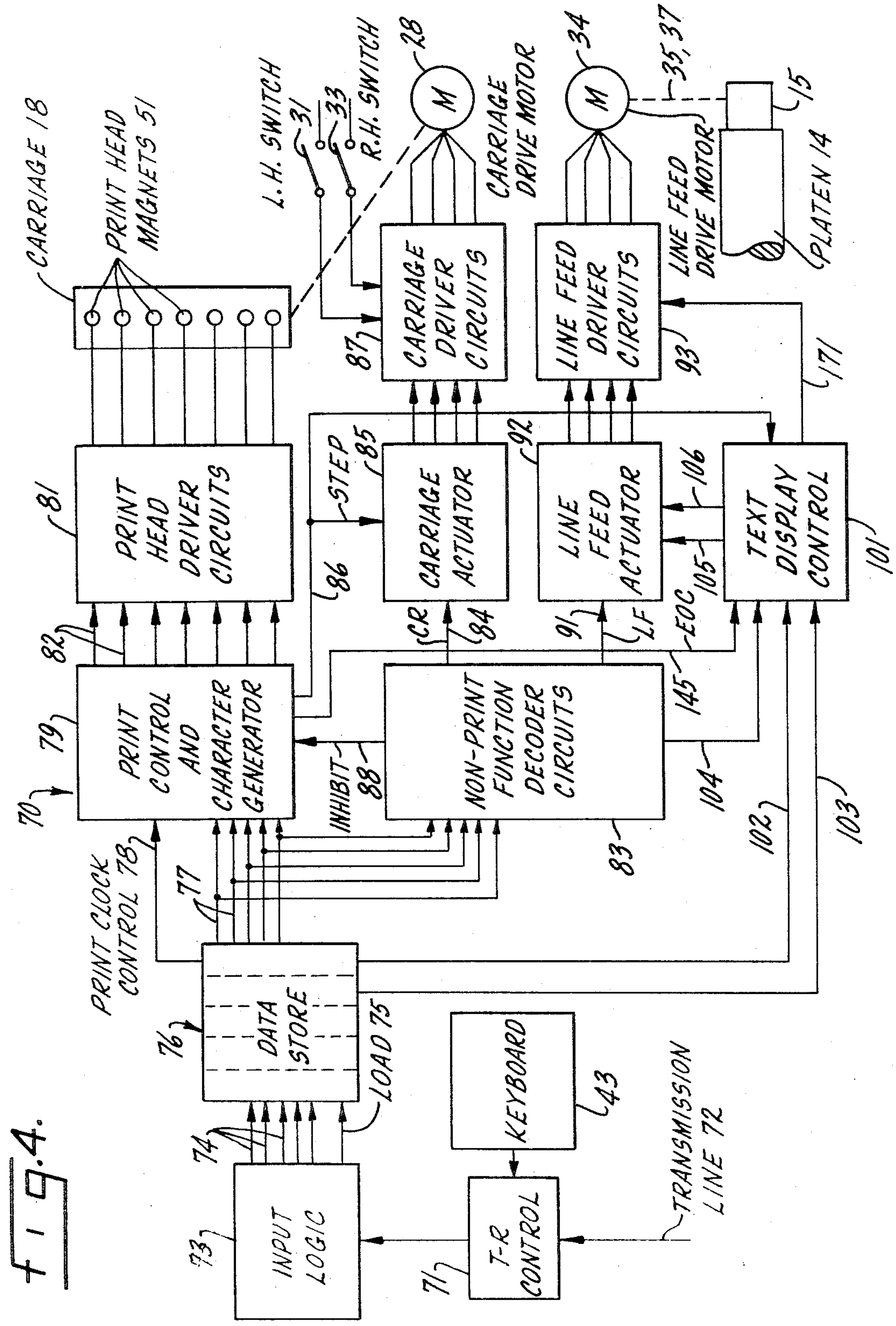
FIG. 4 is a block diagram of a control system for the printer of FIGS. 1 and 2, incorporating a text display control constructed in accordance with one embodiment of the present invention.

FIG. 4 is a block diagram of a basic control system 70 for printer 10. The input stage of control system 70 comprises a transmit-receive control 71 that may be utilized to connect an input logic circuit 73 to either the keyboard 43 or an input transmission line 72. The output of circuit 73 comprises a series of data output circuits 74 and a load signal circuit 75, all coupled to the input level of a data store 76. Data store 76 could be constructed with a single storage level for recording just one code word representative of a single data symbol or of a single non-print function for the printer. Preferably, however, the data store 76 includes a plurality of sequentially connected storage levels, capable of recording a substantial number of code words.

The output level of data store 76 is coupled, by a plurality of data output circuits 77, to the input of a print control and character generator unit 79. A print clock control circuit 78 is also connected from the output level of data store 76 to the input of the print control-character generator unit 79 to afford ameansfor interrelating the timing of its operations with those occurring in data store 76. There are seven output circuits 82 from unit 79 to a print head driver circuit unit 81. The print head driver circuits 81, in turn, include an equal number of output circuits, individually connected to the print head magnets 51 of carriage 18.

The printer control system 70, FIG. 4, also includes appropriate non-print function decoder circuits incorporated in a decoder circuit unit 83. Each of the outputs 77 from the final output level of data store 76 is connected to an input for the function decoder 83. Decoder 83 has a carriage return output circuit 84 that is connected to the input of a carriage actuator unit 85. The carriage actuator unit 85 also receives a step signal input from the print control and character generator unit 79, through a circuit 86. Carriage actuator unit 85 has four outputs that are coupled to a set of carriage driver circuits 87, in turn coupled to the carriage drive motor 28. Both the left-hand switch 31 and the right-hand switch 33 are also connected to the carriage driver circuits 87.

A line feed output 91 from the non-print function decoder unit 83 is connected to the input of a line feed actuator 92. Actuator 92 has four output lines, connected through line feed driver circuits 93 to the line feed drive motor 34.

Printer control 70, as thus far described, is generally conventional in construction and organization. An input signal including a sequence of code words representative both of symbols to be printed and of non-print functions for printer 10 (FIGS. 1, 2) is applied to the input logic circuit 73 through the transmit-receive control 71 (FIG. 4). The source of the input signal may be either keyboard 43 or transmission line 72. Input logic circuit 73 detects the proper start-stop sequence of the encoded data and converts the data from serial to parallel form. For each received code word, a plurality of parallel output signal pulses and a load pulses are applied to the input level of data store 76 to record the code word in the data store. No other external operating signals are required for the input logic 73 in normal operation of system 70.

In data store 76, the parallel recorded data constituting each code word is transferred from the input level to an output level; for most modes of operation, this transfer occurs quite rapidly. When a complete code word is recorded in the final output level of data store 76, a print clock control signal is developed to begin a print-out cycle. For each code word representative of a symbol to be printed, the print clock control signal is applied to the print control logic circuits in unit 79 to activate internal timing logic that applies a column count signal to the integral character generator. The same print timing arrangement supplies a step timing signal to the carriage actuator 85, through circuit 86. For a non-print code word, identified by the decoder circuits 83, the character generator incorporated in unit 79 is inhibited by an appropriate signal supplied thereto through circuit 88.

As each received code word is recorded in the final output level of data store 76, it is sampled by the decoder circuits in the non-print function decoder unit 83. In this manner, carriage return and line feed codes are detected, producing suitable control signals supplied to the carriage actuator 85 and the line feed actuator 92 for control of these printer operations. The inputs to the carriage driver circuits 87 from the carriage position sensing switches 31 and 33 are utilized for internal logic resetting functions. Thus, the basic operation of control system 70 is essentially similar to the system described in detail in Fulton and Zenner U.S. Pat. No. 3,719,781, to which reference may be made for further details of a practical printer control system.

Control system 70, however, incorporates a text display logic unit 101 having a number of different inputs. A first input 102 to the text display logic 101 is derived from the final output level of data store 76. Input 103 to logic unit 101 is taken from the penultimate storage level in data store 76. Input 104 is a line feed input derived from the non-print function decoder unit 83; the normal line feed connection 91 may be omitted. Additional inputs to logic unit 101 may be provided from other parts of the overall control system 70, depending upon the specific circuits utilized in the overall printer control. One complete logic arrangement for text display control 101 is described in detail hereinafter in connection with FIG. 5. Text display control 101 further includes at least two output circuits 105 and 106 connected to line feed actuator 92. Additional outputs for logic unit 101 may also be required, as in the specific circuit of FIG. 5.

The text display logic unit 101 includes display detector means, to which the input 102 is coupled, for developing a display signal indicative of the absence of a code word in the final or output level of data store 76. The text display control 101 further incorporates print reset detector means, coupled internally to the display detector means and externally to the data store 76, for developing a print reset signal indicative of the recording of a code word in an output level of data store 76. It is this print reset detector means that is supplied with the input signal from circuit 103, coupled to the penultimate output level of data store 76. The output connections 105 and 106 are employed to supply the display signal and the print reset signal to the record sheet shift means comprising line feed actuator 92, driving circuits 93, line feed drive motor 34, and the mechanical linkage 35, 37 to the platen 14.

In operation, whenever no code word is stored in the final output level of data store 76, this condition is detected by the display detector means in logic unit 101. If the condition persists for a given minimum time, an output signal is supplied to line feed actuator 92 to actuate the line feed driver circuits 93 and energize line feed drive motor 34 to rotate platen 14 through one or more increments of movement, thereby advancing record sheet 41 to a position at which the last line of the printed text is no longer obscured by ribbon 55, print head carriage 18, bail 54, or any other component of the printing mechanism (see FIG. 1). In a typical system, the paper record sheet 41 is advanced by two line feed increments to clear any masking components of the printing mechanism and place the record sheet in a position in which the full text is displayed. On the other hand, in a given printer a single line feed increment might suffice, or three or more incremental line feed movements may be necessary to achieve the desired full display position for the text.

Subsequently, when a new code word reaches the penultimate level in data store 76, an input signal on line 103 triggers the print reset detector circuits in logic unit 101 into action. When this happens, a print reset signal is generated and supplied to line feed actuator 92 to again actuate the record sheet shift mechanism and move the record sheet back into its original printing position for printing of an additional portion of the text. In this manner, the text continuity is not changed and no extraneous line feed is introduced, as far as the format of the printed text is concerned, in conjunction with the display operation. On the other hand, the terminal portion of the text is always fully visible whenever printer 10 is not actually proceeding with a printing operation.

The utilization of some delay in the operation of text display control logic 101 is highly desirable. If printer 10 is being actuated from keyboard 43, it can be quite disconcerting to the operator to have the paper record sheet 41 jump back and forth between its display and printing positions in the brief intervals between the printing of individual letters that may occur whenever the operator happens to slow down somewhat. On the other hand, an overly extended delay is not particularly desirable; usually, the delay in transfer of the record sheet to the display position, when there is no code word stored in the final output level of data store 76, should be of the order of one-half second, though this can be varied to suit the personal preferences of individual users.

As will be apparent from the foregoing description, the addition of the text display control comprising logic unit 101 and its connections to the other components of control system 70 does not interfere with normal continuous operation of the printer and does not inhibit the speed of continuous operation. Full reading of the printed text is provided whenever printing is interrupted, regardless of whether the printing is predicated upon a local signal originating from a keyboard or upon a transmitted telegraph signal. There is no distortion or disturbance in the printed text and the control is fully automatic, requiring no mechanical changes in the printer. Inasmuch as the logic unit 101 can be fully constructed from solid state circuitry, it is quite capable of long-term operation with little or no special maintenance or expense and is relatively simple and economic in construction.

Figure 5:
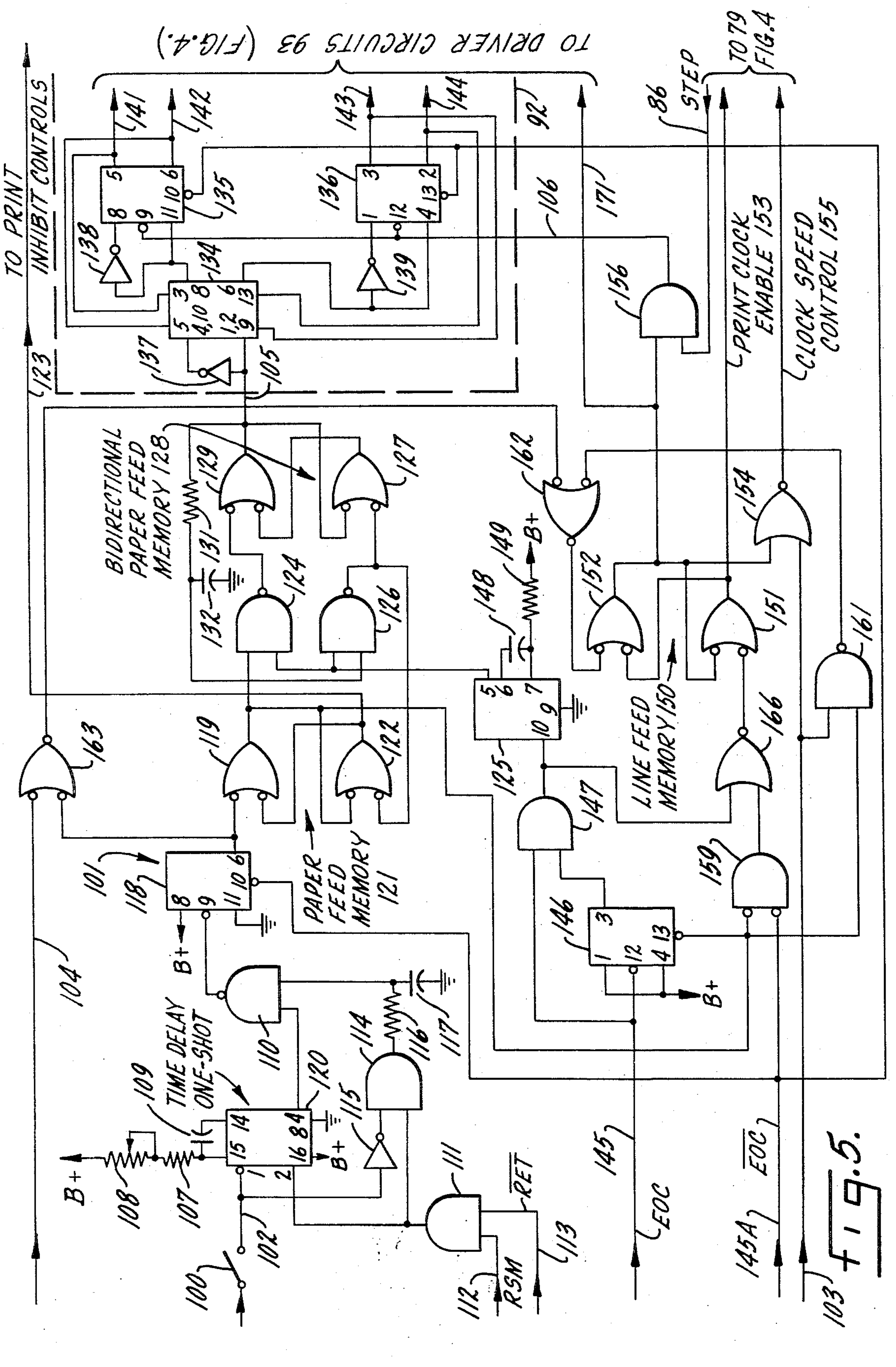
FIG. 5 is a detail schematic logic diagram of one form of the text display control incorporated in FIG. 4.

FIG. 5 illustrates one specific form of the logic unit 101 that can be utilized in high speed dot matrix printers of the commercial form presently manufactured by Extel Corporation. In the specific construction for display detector logic 101 illustrated in FIG. 5, the input line 102 from the final storage level of data store 76 includes a series disabling switch 100. Switch 100 is provided as a means to disable the text display control 101 if desired; for example, with an extremely slow operator using keyboard 43, the text display control might better be left turned off.

Line 102 is coupled to one input of a one-shot circuit 120 connected for operation as a time delay circuit. The time delay circuit includes a resistor 107 connected to one terminal of the one-shot and in turn connected to a B+ supply through a potentiometer 108. A capacitor 109 is incorporated in the time delay circuit and is connected across two terminals of one-shot 120. An output connection is taken from one-shot 120 to one input of a NAND gate 110.

A further input to device 120 is provided from the output of an AND gate 111 having two inputs 112 and 113. The output of gate 111 is also applied to one input of an AND gate 114. A second input to gate 114 is taken from the input line 102 through an inverter 115. The output of gate 114 is connected to a time delay circuit comprising a series resistor 116 and a capacitor 117 that is returned to system ground. The common terminal of resistor 116 and capacitor 117 is connected as a second input to gate 110.

The output of gate 110 is connected to an inverting input of a flip-flop circuit 118. One set input of flip-flop 118 is connected to the B+ supply and the other set input of the flip-flop is connected to system ground. The output of flip-flop 118 is connected to one input of a NOR gate 119 that is incorporated in a paper feed memory latch circuit 121 that includes a second similar NOR gate 122. The output of gate 119 is connected to one input of gate 122 and the output of gate 122 is connected to the second input of gate 119. The output of gate 122 is also connected to a line 123 that extends to the circuits of the printer (not shown) that inhibit normal printing operations.

The output of gate 119 is also connected to one input of a first intermediate control gate, the NAND gate 124. A second input to gate 124 is taken from the output of a one-shot circuit 125, described more fully hereinafter, the output from one-shot 125 is also connected to one input of a second intermediate control gate, the NAND gate 126. The output of gate 126 is connected back to the second input of gate 122 in the paper feed memory latch 121 and is also connected to one input of a NOR gate 127 in a second latch circuit 128 referred to hereinafter as the bi-directional paper feed memory latch. In latch 128, gate 127 is paired with a second NOR gate 129. One input to gate 129 is derived from the output of the intermediate control gate 124. The output of gate 129 is connected back to the second input of gate 127 and the output of gate 127 is connected to the second input of gate 129 to complete the latch configuration. The output of gate 129 is also connected back to the second input of gate 126 through a time delay circuit comprising a series resistor 131 and a shunt capacitor 132, capacitor 132 being returned to system ground.

The output from gate 129 constitutes the output circuit 105 from text display control logic unit 101 to the line feed actuator circuits 92 of control system 70 (see FIG. 4). In FIG. 5, a part of the line feed actuator circuits 92 are illustrated, comprising a dual AND-OR invert gate 134 and two flip-flops 135 and 136. Line 105 is connected directly to one input of gate 134 and is connected to the other related input of gate 134 through an inverter 137. One output of gate 134 is connected to two set inputs of flip-flop 135; a direct connection is employed for one of these input connections and the second connection is made through an inverter 138. The inverse output of gate 134 is similarly connected to device 136, with one connection being made direct and the other through an inverter 139. Two connections are provided from the outputs 141 and 142 of flip-flop 135 back to gate 134. Similarly, the outputs 143 and 144 of device 136 are connected back to inputs of gate 134. The four lines 141 through 144 afford the necessary pulse signal connections from line feed actuator circuit 92 to the line feed driver circuits 93 that energize motor 34 for a line feed operation (see FIG. 4).

Text display logic unit 101, in the specific construction illustrated in FIG. 5, includes an additional input line 145 that supplies an end-of-character (EOC) signal to an inverting input of a flip-flop circuit 146. The two normal set inputs for flip-flop circuit 146 are both connected to the B+ supply. An output from flip-flop 146 is connected to one input of an AND gate 147, the second input to gate 147 being derived directly from the EOC input line 145. The output of gate 147 is connected to a trigger input for one-shot 125. The other trigger input for one-shot 125 is connected to system ground and two terminals of device 125 are connected to a timing circuit comprising a capacitor 148 and a resistor 149, resistor 149 being connected to the B+ supply. Device 125 functions as a single-shot circuit producing pulses of very short duration on the output line that is connected to one input of each of the intermediate control gates 124 and 126.

Display control 101 (FIG. 5) further comprises a line feed memory latch circuit 150 including two NOR gates 151 and 152. The output of gate 151 is connected to one input of gate 152 and the output of gate 152 is connected to one input of gate 151. The output of gate 151 is connected to a line 153 that extends to the print clock in unit 79 of central system 70 (FIG. 4). The output of gate 152 in line feed memory 150 is connected to one input of a NOR gate 154, the output of gate 154 being connected to a line 155 that supplies a clock speed control signal to generator circuit 79 (FIG. 4), for use in a printer incorporating a multi-speed print clock.

The output of gate 152 is also connected to one input of an AND gate 156. The second input to gate 156 is the step signal, derived from line 86 (FIG. 4). The output of gate 156 is connected to inverting inputs for both of the flip-flops 135 and 136 in line feed actuator unit 92.

A second end-of-character (EOC) input signal to display detector logic 101 is supplied on an input line 145A; this EOC signal is the inverse of the EOC signal available on line 145. The EOC signal from line 145A is applied as a reset signal to the flip-flop 118. It is also applied to each of the two flip-flops 135 and 136 in line feed actuator 92. This same EOC signal is applied to one input of a NAND gate 159. Gate 159 receives a second input from the output of gate 119 in the paper feed memory latch 121. The signal from the output of gate 119 is also supplied to flip-flop 146 and is connected to one input of a NAND gate 161.

The output of gate 159 is connected to one input of a NOR gate 166. A second input to gate 166 is derived from the output of gate 147. The output of gate 166 constitutes the second input to gate 151 in the line feed memory latch circuit 150.

The second input to gate 161 is taken from the input circuit 103 that is derived from the penultimate storage level in data store 76 (FIG. 4). Line 103 is also connected to the second input for gate 154. The output of gate 161 is connected to one input of an OR gate 162 having its output connected to the remaining input of gate 152 in latch circuit 150. The second input to gate 162 is derived from the output of an OR gate 163. One of the two inputs to gates 163 is taken from the output of flip-flop 118 and the other input to gate 163 comprises the line 104 (see FIG. 4) that is utilized to supply a line feed command from the main control system.

In considering the operation of display detector logic unit 101, in the form illustrated in FIG. 5, as a part of control system 70 (FIG. 4), it may initially be assumed that printer 10 (FIGS. 1 and 2) is engaged in a printing operation, actuated by signals from keyboard 44 or by a received signal on transmission line 72 (FIG. 4). Upon occurrence of any interruption in the input signal to control system 70, a condition is reached in which no code word is recorded in the final or output level of data store 76 (FIG. 4). Occurrence of this condition originates a signal on line 102 which is applied to the time delay one-shot device 120 as an enabling signal. If a new code word is recorded in the final stage of the data store before the full time interval of one-shot 120 elapses (the time interval is adjustable and is determined by circuit elements 107–109), the resulting change in signal polarity on line 102 effectively applies an inhibit signal to gate 110, through inverter 115 and gate 114. Under these circumstances, the paper record sheet 41 (FIG. 1) is not advanced to display condition and the printing operation proceeds in the normal manner. As noted above, the time delay interval for device 120 is usually of the order of one-half second, but is subject to variation by adjustment of potentiometer 108.

When the time delay one-shot device 120 times out, it applies an enabling signal to gate 110. This signal is supplied as an actuating signal to flip-flop circuit 118 unless gate 110 has been inhibited by prior recording of a new code word in the output level of the data store, as described above, or gate 110 is otherwise inhibited by a signal from gate 114. If the printer carriage has moved far enough to the right to actuate the right margin switch 33 (FIG. 1) gate 110 is inhibited by a signal derived from input line 112 and supplied to gate 110 through gate 111 and gate 114. Similarly, if a carriage return operation is going forward in the printer, gate 110 is inhibited by a signal supplied to logic unit 101 through input line 113, utilizing the same basic circuit. In all of these instances, it is considered undesirable to initiate a text display operation.

Whenever flip-flop 118 is actuated, as described above, a text display operation is started. An output signal is supplied from device 118 to gate 152 in the line feed memory latch 150, through gates 163 and 162. This initiates a line feed operation in essentially the same manner as a line feed signal on input line 104; a normal line feed operation is described hereinafter.

When the line feed memory latch 150 is set, an enabling signal is applied from gate 151, via line 153, to initiate operation of the print clock. In addition, an output signal from gate 152 is supplied, through gate 154, to line 155. This signal on line 155 is an enabling signal that maintains the print clock in high speed operation until latch 150 is subsequently reset. The output signal from gate 152 in latch 150 is also applied to a line 171 connected to the line feed driver circuits 93 (FIG. 4). The signal on line 171 is an enabling signal utilized to supply operating voltage to driver circuits 93. In addition, with latch 150 set the output from gate 152 applies a continuous enabling signal to gate 156.

With the print clock in operation, a series of step signal pulses are supplied to gate 156 (FIG. 5) on input line 86. Because gate 156 is enabled, the step pulses are applied to circuits 135 and 136. A total of eight pulses are required for each line feed advance, in a typical system such as the commercial Extel Corporation printer. The step pulses applied to flip-flops 135 and 136 cause those devices to generate a series of output pulses on lines 141-144, in predetermined sequence, that actuate the line feed driver circuits 93 (FIG. 4) to energize motor 34. The sequence of pulse signals on lines 141–144 (FIG. 5) is such that the line feed motor is actuated in a direction to advance the record sheet 41 toward a text display position. The advancing movement of the record sheet continues as long as gate 156 is enabled and step signals recur on input line 86.

When the text display operation is initiated, by actuation of flip-flop 118, the output signal from device 118 is also applied to gate 119 to set the paper feed memory latch 121. With latch 121 in its set condition, gate 119 applies an enabling signal to the intermediate gate 124, to device 146, and to gate 161, all in preparation for subsequent operations. The same signal is applied to gate 159 as an inhibit signal, preventing gate 159 from passing a $\overline{EOC}$ signal as long as the paper feed memory latch 121 remains in its set condition. The setting of the paper feed memory latch 121 also develops an inhibit signal on the output of gate 122 in the latch; this inhibit signal is supplied, on line 123, to appropriate circuits in the print control and character generator 79 to inhibit normal printing operations.

When the print clock has run through a first complete cycle, end-of-character signals are developed and are supplied to logic unit 101 on input lines 145 and 145A. The $\overline{EOC}$ input signal on line 145A is applied to flip-flop circuit 118 to reset the flip-flop. This makes no immediate change in circuit operation, since the output of flip-flop 118 is utilized only to set latches 121 and 150 and these two latches remain in their set condition. The $\overline{EOC}$ input signal on line 145A is blocked at gate 159, to which an inhibit signal is being applied from gate 119 in the paper feed memory latch 121. However, the $\overline{EOC}$ signal is supplied to flip-flops 135 and 136 to condition those devices for a second round of operation.

The first EOC signal on line 145, which identifies the completion of a single line feed advance of the record sheet toward text display position, is applied to gate 147 and is inhibited because it is of opposite polarity from the available signal supplied to gate 147 from flip-flop 146. The EOC signal on line 145 is also applied to flip-flop 146 as an actuating signal. The resultant change in state of flip-flop circuit 146 changes the output signal from that device, so that gate 147 will be enabled upon occurrence of the next EOC signal on line 145. The print clock remains enabled, as discussed above, and the paper advance continues through a second line feed advance in response to the continuing step signals supplied to the text display control logic 101 on input line 86.

When a complete second line feed advance has been accomplished, a second end-of-character signal pulse is applied to logic unit 101 on line 145. This EOC signal, as applied to gate 147, now corresponds in polarity to the input signal to gate 147 from flip-flop 146. Consequently, an output signal is developed by gate 147 and this signal is supplied, through gate 166, to gate 151 to reset the line feed memory latch 150. With latch 150 reset, the clock enabling output on line 153 is interrupted, stopping operation of the print clock in the print control and character generator 79 (FIG. 4). The enabling input to gate 156 is also interrupted, so that no further step signals can be supplied to devices 135 and 136 via line 106. Furthermore, the enabling output on line 171 to the line feed driver circuits 93 is interrupted, so that no additional stepping pulses can be applied to the line feed motor 34. In this manner, the advancing movement of the record sheet 41 is stopped after two full line feed increments, with the record sheet in a text display position free of obstruction of printer components such as carriage 18, bail bar 54, ribbon 55, or the like (FIG. 1). At the same time, the $\overline{EOC}$ signal from line 145A again resets the flip-flops 135 and 136 for subsequent operations.

With the paper or other record sheet 41 in the desired text display position, logic unit 101 must be conditioned for a subsequent operation to move the record sheet back down to its printing position. This operation is initiated by the output signal from gate 147, which actuates one-shot circuit 125. Device 125 produces a brief enabling pulse signal that is supplied to the intermediate gates 124 and 126. This enabling signal has no effect upon the operating condition of gate 126, being of the wrong polarity, but causes gate 124 to generate an output signal that is supplied to gate 129 in the bi-directional paper feed memory latch 128, actuating latch 128 to its set condition.

The setting of latch 128 causes gate 129 to develop an output signal that is applied to device 134 in the line feed actuator circuits 92. Device 134 is actuated from its initial operating condition to an alternate operating condition in which it develops output signals that are supplied to flip-flops 135 and 136 to condition the flip-flops to produce output pulses in a different sequence for reverse movement of the record sheet back to the printing position. The output signal from gate 129 is also applied to the intermediate gate 126, after a brief time delay, as an enabling signal for future operations. The movement of the record sheet to text display position is now complete, the text display control unit 101 has been conditioned for a subsequent movement back to printing position, and the record sheet 41 remains in the text display position until some new code word is recorded in data store 76.

When transmission is resumed on line 72 (FIG. 4), or when the operator resumes operation of keyboard 43, additional code words are supplied to data store 76 through the transmit-receive control 71 and input logic 73. When the first code word in the new transmission is recorded in the penultimate output level of data store 76, an output signal is produced on line 103 and is supplied to the display detector logic unit 101.

In logic unit 101 (FIG. 5), the input signal on line 103 actuates gate 154 to supply an output signal on line 155 and again start the print clock in high speed operation. The same signal from line 103 is applied to gate 161, which has previously been enabled by the output signal from gate 119 in the paper feed memory latch 121. As a consequence, gate 161 develops an output signal that is supplied to gate 152 in the line feed memory latch 150, through gate 162, again setting latch 150. With latch 150 set, a continuous enabling signal is supplied to the print clock through line 155 and an enabling signal is supplied to the line feed driver circuits 93 on line 171, just as in the previously described operation for advancing the record sheet to a text display position. Furthermore, gate 156 is again enabled so that the step signals from the print clock, received on line 86, are again applied to flip-flops 135 and 136 to develop a sequence of step pulses on lines 141–144. However, the sequence of signals on lines 141–144 is now changed so that the line feed motor 34 (FIG. 4) is driven in reverse and the paper or other record sheet 41 is moved back toward the printing position.

When a reverse movement of the record sheet equivalent to one line feed advance movement, but in the reverse direction, has been completed, end-of-character signals are again supplied to logic unit 101 on lines 145 and 145A. The first EOC signal on line 145 is again applied to flip-flop circuit 146 to actuate the flip-flop circuit and supply an enabling signal to gate 147. As before, however, the enabling signal to gate 147 from device 146 is not available simultaneously with the EOC signal on line 145, and gate 147 is not yet enabled. Accordingly, the reverse movement of the record sheet continues in response to the continuing series of step signals applied to logic unit 101 on line 86.

When the reverse movement of the paper has proceeded through two complete cycles, equivalent to but opposite from two line feed advance movements, a second end-of-character signal appears on each of the input lines 145 and 145A. This time, gate 147 has an enabling signal from flip-flop 147 and hence is actuated, producing an output signal that is applied to one-shot 125 and that is also applied, through gate 166, to gate 151 in the line feed memory latch 150. The signal to gate 151 resets the line feed memory latch.

With the line feed memory latch 150 again reset, the enabling output to the print clock on line 153 is interrupted and control of the print clock is returned to the normal operating circuits of printer 10. The clock speed control signal on line 155 is also interrupted for the same purpose. The enabling signal that had been supplied to gate 156 from latch 150 is discontinued so that subsequent step signals on line 86 can no longer actuate flip-flops 135 and 136. The enabling signal to the line feed driver circuits on line 171 is also interrupted.

The actuation of one-shot 125 supplies an enabling signal to both of the two intermediate gates 124 and 126. Each of the gates 124 and 126 already has an enabling signal from another source; gate 124 is enabled by the output from gate 119 and gate 126 is enabled from the output of gate 129.

The actuation of gate 124, in this instance, has no important operational effect. The actuation of gate 126, on the other hand, produces an output signal that is applied to gate 127 to reset the bi-directional paper feed memory latch 128. With latch 128 reset, the output signal from gate 129 changes in polarity, restoring device 134 to its original condition, ready for a subsequent line feed operation or for a subsequent advancement of the record sheet to its text display position.

The output signal from gate 126 is also applied to gate 122 in the paper feed memory latch 121 and resets latch 121. With latch 121 reset, the text display operation is completed with the record sheet returned to the normal printing position. Furthermore, the inhibit signal output on line 123 is discontinued so that normal printing operations can proceed. As before, the flip-flops 135 and 136 have been reset by the second $\overline{EOC}$ signal from line 145A.

Using the circuit 101 of FIG. 5, normal line feed operations are effected by actuation of the line feed memory latch 150 through a line feed signal supplied on input line 104 from the non-print function decoder circuits 83 (FIG. 4). The line feed movement is actuated and controlled in the same manner as described above for a text display operation, except that the paper feed memory 121 is not set and no inhibit signal is applied to gate 159 from gate 119. Consequently, the normal line feed operation is terminated by the first $\overline{EOC}$ signal on line 145A, which resets the line feed memory latch 150 through gates 159 and 166.

From the foregoing description of the specific text display control logic unit 101 illustrated in FIG. 5, it will be apparent that the text display control affords display detector means, particularly incorporating the one-shot 120, flip-flop 118 and the latch 121, which develop display signals indicative of the absence of a code word in the final output level of the data store 76. Control unit 101 also affords print reset detector means, comprising gate 161, which develops print reset signals indicative of the subsequent recording of a code word in the penultimate output level of the data store 76. Latch 150 and gate 156 are utilized as coupling means to supply the display and print reset signals to the record sheet shift means (line feed circuits 92, driver circuits 93, motor 34, etc.), in each instance as a series of step pulses, to shift the record sheet 41 to the text display position and back to the printing position as required. The entire control 101 is solid-state in construction to afford long, essentially maintenance-free life, and the control requires no mechanical change in printer 10.

To afford a more complete description of the specific control of FIG. 5, specific circuit parameters are set forth below. This information is presented solely by way of illustration and in no sense as a limitation on the invention:

Solid State Devices

| | Type |
|---|---|
| One-shots 120, 125 | 74123 |
| Gates 110, 119, 122 | 7400 |
| Gates 124, 126, 127, 129 | 7400 |
| AND-OR-invert gate 134 | 7451 |
| Inverters 115, 137, 138, 139 | 7404 |
| Flip-flops 135,136 | 74107 |
| Gates 114, 147, 163 | 7408 |
| Flip-flops 118, 146 | 74107 |
| Gates 154, 159, 166 | 7402 |
| Gates 151, 152, 161 | 7400 |
| Gates 111, 156, 162 | 7408 |

Impedances

| | |
|---|---|
| Resistor 107 | 15 Kilohms |
| Potentiometer 108 | 20 do. |
| Resistors 116, 131 | 330 ohms |
| Resistor 149 | 5.6 kilohms |
| Capacitor 109 | 100 microfarads |
| Capacitor 132 | 1000 picofarads |
| Capacitor 148 | 47 do. |
| Capacitor 117 | 0.05 microfarad |

We claim:

1. In a data printer for printing a data symbol text on a record sheet in response to an input signal including a sequence of code words representative of symbols to be printed and of non-print functions for the printer, of the kind comprising a data store for recording the input signal and a printing mechanism responsive to data recorded in the data store for recording symbols on a record sheet, a text display control comprising:

record sheet shift means for shifting the record sheet between a printing position in which some component of the printer masks a terminal portion of the printed text on the record sheet and a text display position in which the terminal portion of the text is visible;

display detector means, coupled to the data store, for developing a display signal indicative of the absence of a code word in an output level of the data store;

print reset detector means, coupled to the data store and to the display detector means, for developing a print reset signal indicative of the recording of a code word in an output level of the data store after the record sheet has been shifted to its text display position;

and coupling means for effectively applying the display and print reset signals to the record sheet shift means to actuate the record sheet shift means to shift the record sheet to its text display position and to return the record sheet to its printing position.

2. A text display control for a data printer, according to claim 1, in which the record sheet shift means comprises the line feed mechanism of the printer and in which the coupling means includes means for actuating the line feed mechanism a given number of line feed increments in a line feed direction to shift the record sheet to the text display position and for actuating the line feed mechanism the same number of line feed increments in reverse of the line feed direction to shift the record sheet back to the printing position.

3. A text display control for a data printer, according to claim 1, in which the display detector means includes time delay means for inhibiting development of the display signal unless and until the absence of a code word in an output level of the data store has persisted for a predetermined time interval.

4. A text display control for a data printer, according to claim 3, in which the time delay means is adjustable and affords a range of time intervals.

5. A text display control for a data printer, according to claim 3, in which the time delay is of the order of one-half second.

6. A text display control for a data printer, according to claim 1, in which the data store includes a plurality of sequentially activated storage levels, in which the display detector is coupled to the final output level of the data store, and in which the print reset detector means is coupled to the penultimate output level of the data store.

7. A text display control for a data printer, according to claim 1, and further comprising inhibit means for inhibiting operation of the display detector means whenever the printer is carrying out a carriage return operation.

8. A text display control for a data printer, according to claim 1, and further comprising inhibit means for inhibiting operation of the display detector means whenever the printer prints the end portion of a line of text and has not been actuated to condition to start the next line.

9. A text display control for a data printer, according to claim 1, in which the display detector comprises, in series, a time delay circuit requiring an input enduring for a predetermined time delay interval to produce an output signal and having an input coupled to the final output level of the data store for actuation in response to the absence of a code word recorded therein, a latch circuit actuated from a normal condition to a set condition by the output of the time delay circuit, and an inhibit gate interposed between the time delay circuit and the latch to preclude setting of the latch whenever a new code word is recorded in the final output level of the data store before expiration of the time-delay interval.

10. A text display control for a data printer, according to claim 1, for use in a printer including a print clock for controlling the timing of printing operations, in which the display detector means is connected to the print clock to start the print clock, independently of any printing operation, upon initiation of the display signal, and in which the coupling means is coupled to the print clock and supplies step signals from the print clock to the record sheet shift means as long as the display signal is available.

11. A text display control for a data printer, according to claim 10, in which the print reset detector means is also connected to the print clock to start the print clock, independently of any printing operation, upon initiation of the print reset signal, and in which the coupling means supplies step signals from the print clock to the record sheet shift means as long as the print reset signal is available.

12. A text display control for a data printer, according to claim 11, and further comprising means for interrupting each of the display and print reset signals after a given number of cycles of the print clock.

* * * * *